No. 883,486. PATENTED MAR. 31, 1908.
N. F. ROADHOUSE.
SWITCH ACTUATING DEVICE.
APPLICATION FILED JAN. 18, 1907.
2 SHEETS—SHEET 1.
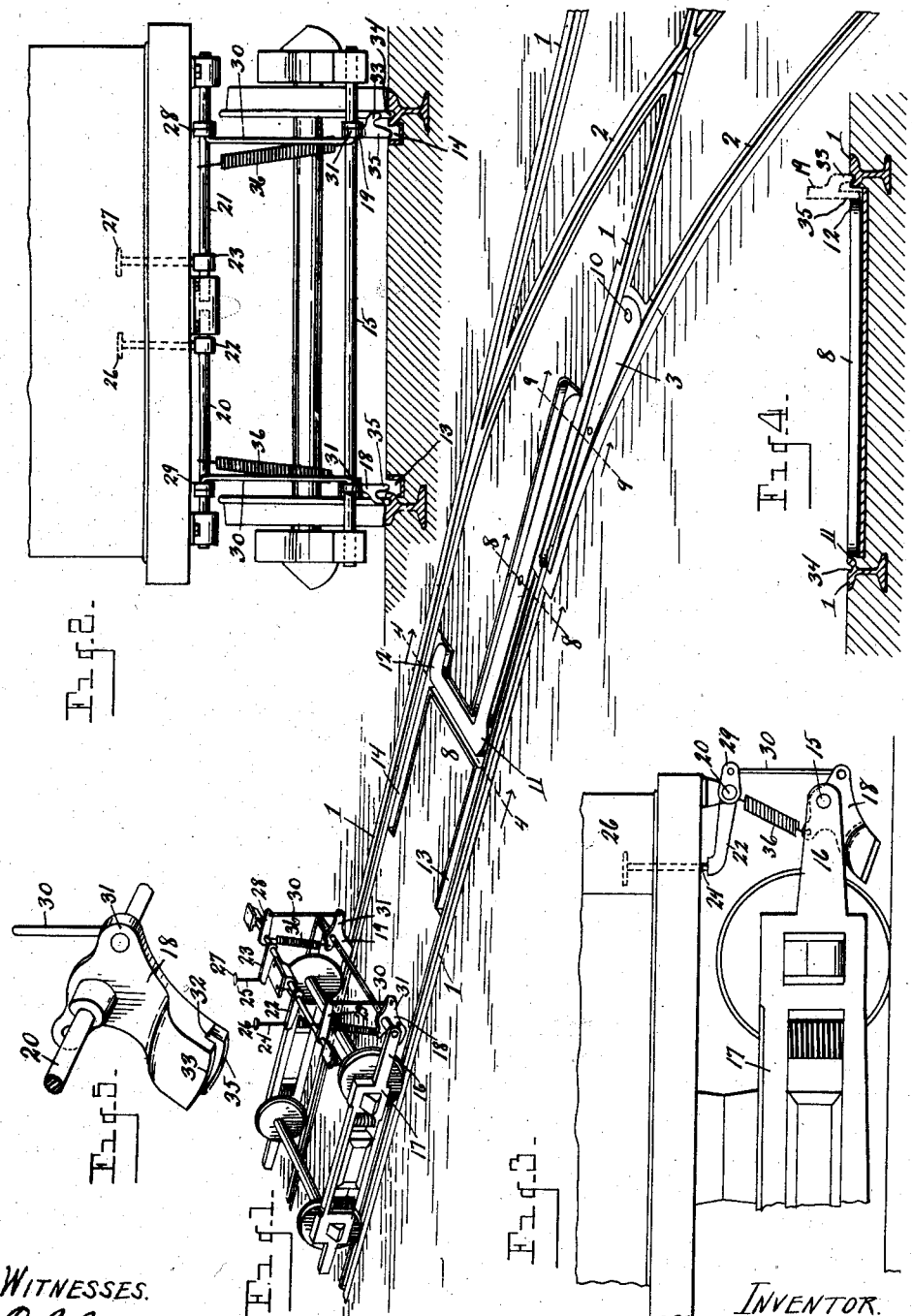
WITNESSES.
Q. B. Baenziger
J. G. Howlett
INVENTOR.
Norman F. Roadhouse,
By E. A. Wheeler & Co.
HIS ATTORNEYS.

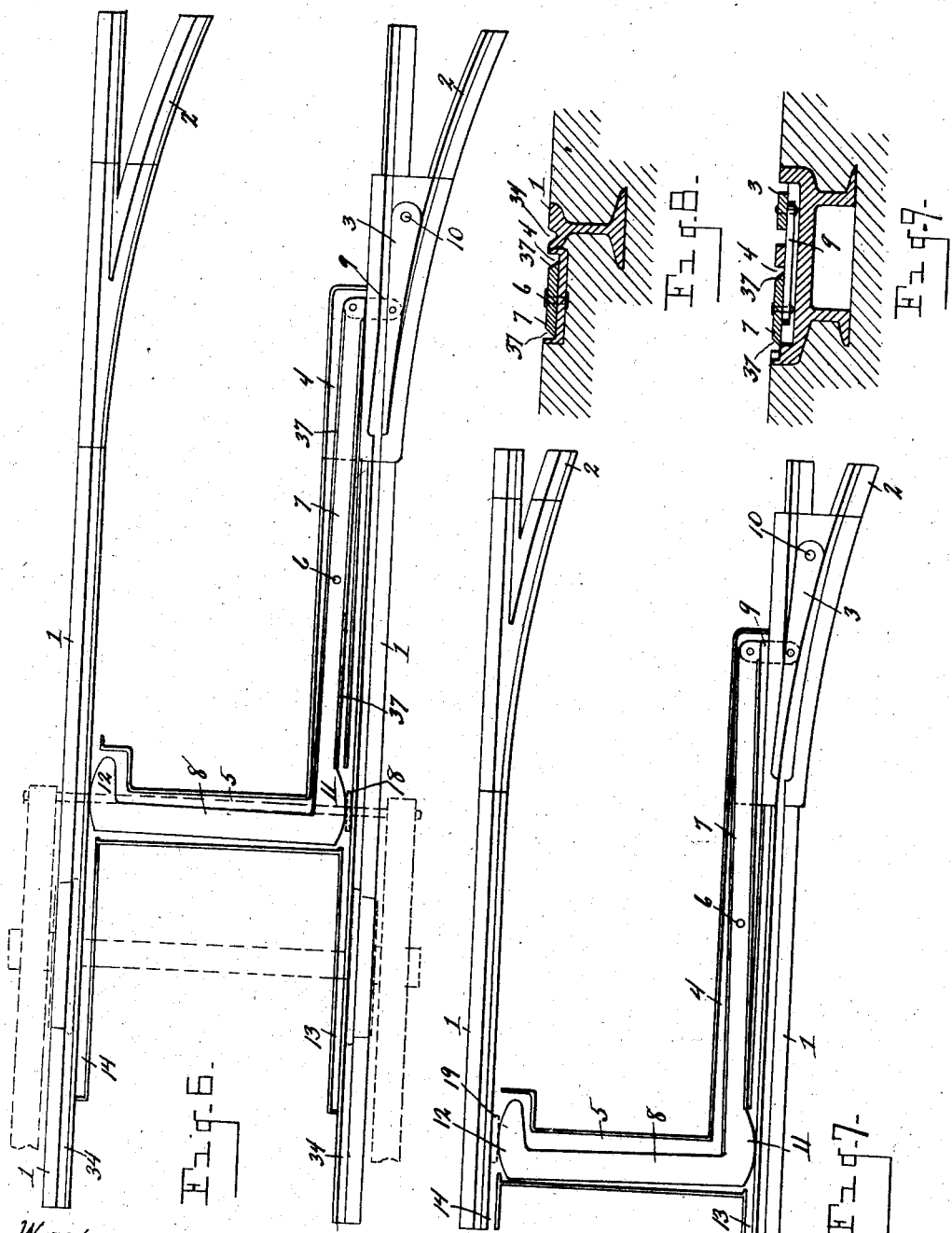

UNITED STATES PATENT OFFICE.

NORMAN F. ROADHOUSE, OF DETROIT, MICHIGAN, ASSIGNOR, BY DIRECT AND MESNE ASSIGNMENTS, OF ONE-FOURTH TO JOHN T. ETZEL, ONE-HALF TO WILLIAM C. GENDRON, AND ONE-FOURTH TO AUGUST KOERNIG, OF DETROIT, MICHIGAN.

SWITCH-ACTUATING DEVICE.

No. 883,486.  Specification of Letters Patent.  Patented March 31, 1908.

Application filed January 18, 1907. Serial No. 352,844.

*To all whom it may concern:*

Be it known that I, NORMAN F. ROADHOUSE, a citizen of the United States, residing at Detroit, in the county of Wayne, State of Michigan, have invented certain new and useful Improvements in Switch-Actuating Devices; and I do declare the following to be a full, clear, and exect description of the invention, such as will enable others skilled in the art to which it appertains to make and use the same, reference being had to the accompanying drawings, and to the figures of reference marked thereon, which form a part of this specification.

This invention relates to a mechanical switch actuating device, more expressly designed for use in connection with street railways, and consists in the construction and arrangement of parts hereinafter fully set forth and pointed out particularly in the claims.

The object of the invention is to provide means carried by the car and under the control of the motorman or driver, for mechanically actuating the switch to enable the car to turn out in either direction or pass straight along the track without requiring the motorman to leave the car for the purpose of throwing the switch and without requiring the car to be stopped before the switch is actuated.

The above object is attained by the mechanism illustrated in the accompanying drawings, in which:—

Figure 1 is a perspective view of a portion of a track provided with my improved switch actuating device, and a fragmentary view in perspective of a portion of a car truck equipped with means for mechanically operating the switch actuating device. Fig. 2 is an elevation of the end of a car equipped with the shoes employed to operate the switch actuating device, the track appearing in cross section. Fig. 3 is a side elevation of the parts shown in Fig. 2. Fig. 4 is a transverse section through the track as on line 4—4 of Fig. 1, showing by dotted lines one of the shoes in position for actuating the switch operating device. Fig. 5 is a perspective view of one of said shoes. Fig. 6 is a plan view of a section of track showing a turn out and a switch provided with my improved operating device, also showing by dotted lines the position of a car truck upon the track in position to actuate said operating device. Fig. 7 is a similar view showing the position of the parts when the switch tongue is swung in a direction opposite to that shown in Fig. 6. Fig. 8 is a transverse section through the track as on line 8—8 of Fig. 1. Fig. 9 is a transverse section through the track as on line 9—9 of Fig. 1.

Referring to the characters of reference, 1 designates the rails of the track which are of the ordinary grooved type. Leading from the main rails of the track are the rails 2 of the turn out and properly positioned at the junction of said rails is the usual pivoted switch tongue 3.

Formed in the track between the rails thereof at the junction of the turn out rails with the main rails is an L-shaped depression consisting of a main portion 4 which extends parallel with the main rails of the track, and a transverse portion 5 communicating with the main portion and extending transversely of the track between the main rails. Lying in said depression and pivoted at 6 therein is an L-shaped operating lever 7 having a portion 8 extending transversely of the track. One end of the lever 7 is pivotally connected to the tongue 3 of the switch by means of the transverse link 9 whereby the movement of the lever is imparted to said tongue to swing it upon its pivotal point 10. At the opposite ends of the transverse portion 8 of the operating lever are the curved projections 11 and 12 respectively which serve as cam faces and which project sufficiently to successfully lie in contact with the inner faces respectively of the rails 1 as said lever is swung to the limit of its movement in opposite directions upon its fulcrum 6.

Extending parallel with the main rails of the track are the channels 13 and 14 respectively which communicate with the opposite ends of the transverse portion 5 of the depression in which the operating lever is pivoted, the rounded ends 11 and 12 of the transverse portion of said lever lying in the communicating openings between the ends of the transverse portion of said depression and said channels 13 and 14.

The shoes which are employed to actuate the operating lever to throw the tongue of the switch are mounted upon a transverse shaft 15 whose ends are supported in the extensions 16 of the truck frame 17, said shoes of which there are two, and which are respectively designated by the reference numerals 18 and 19, are loosely mounted upon said shaft near the ends thereof in proximity to and nearly in alinement with the wheels of the truck. Hung from the under side of the car frame are the rock shafts 20 and 21. Said shafts are provided respectively with the horizontally extending arms 22 and 23 carrying at their free ends the standards 24 and 25 which support the respective pedals 26 and 27 that extend upwardly through the floor of the car. Projecting forwardly from the rock shafts 20 and 21 are the respective crank arms 28 and 29. Depending from said crank arms are the connecting rods 30 whose lower ends are coupled respectively to the forwardly extending arms 31 of the shoes 18 and 19. Each of the shoes in its under face is provided with a groove 32 forming upon one side thereof a flange 33 which is adapted to enter the groove 34 in the rails of the track, and forming upon the other side of said groove a depending lip 35 adapted to extend downwardly into the channel which extends parallel with the inner face of each of the track rails, said lip when the shoe is depressed being adapted to engage the rounded end portion of the transverse part of the operating lever and actuate said lever to throw the switch tongue as the car is moving along the track. It will now be understood that by depressing said pedals the rock shafts may be actuated to carry the shoes connected therewith into contact with the rails of the track, and that either of said shoes may be operated at will in accordance with the direction it is desired the car shall take.

In the operation of this device and with the parts in the position shown in Fig. 1, on approaching the switch from the left, should it be desirable to switch the car onto the rails 2 of the turn out track, the shoe 19 is depressed so as to cause the flange 33 thereof to engage in the groove 34 of the rail and the lip thereof to lie in the channel 14 so as to engage the rounded end 12 of the transverse portion of the operating lever, as shown by dotted lines in Fig. 7, thereby shifting said lever upon its fulcrum to draw upon the link 9 and swing the tongue 3 so as to direct the wheels of the car onto the rails 2. Should the switch be in the position shown in Fig. 7 at the approach of a car which it is desired to continue along the straight rails of the track, or the rails 1, the shoe 18 is depressed the lip 35 of which is caused to engage the rounded end 11 of the transverse portion of the operating lever and move said lever to swing the tongue 3 to the position shown in Fig. 6, thereby continuing the course of the car along the rails 1. These operations it will be understood are performed while the car is in motion, obviating the necessity of stopping the car to operate the switch and effecting a material saving in time.

For the purpose of raising the shoes after they have been carried downwardly into contact with the rails to actuate the switch, each shoe is provided with a retractable spring 36 suitably connected thereto, the tension of which is sufficient to raise the shoe after the pressure shall have been removed from the operating pedal.

To prevent any obstruction lying in the depression 4 interfering with the operation of the L-shaped lever, the edges of said lever may be beveled as shown at 37 so as to free said depression from any foreign object or accumulated ice.

Having thus fully set forth my invention, what I claim as new and desire to secure by Letters Patent, is:—

The combination of the track rails, turn out rails communicating therewith, a movable switch member at the junction of said rails, an operating lever lying within the rails of the track and jointedly connected with said switch member, said lever having an integral transverse portion crossing between the track rails and provided with rounded terminals, a car truck-frame movable along the track, shoes pivotally mounted on the truck-frame adjacent to and in advance of the wheels, said shoes being provided with means for engaging the track rails and each shoe having a depending lip to engage the rounded end of the transverse portion of said lever, means for independently depressing the shoes to carry them into contact with the rails of the track, and means for raising said shoes from the track rails.

In testimony whereof, I sign this specification in the presence of two witnesses.

NORMAN F. ROADHOUSE.

Witnesses:
O. B. BAENZIGER,
I. G. HOWLETT.